(12) United States Patent
Witschey et al.

(10) Patent No.: US 12,395,517 B2
(45) Date of Patent: *Aug. 19, 2025

(54) INFRASTRUCTURE AS CODE PREDEPLOYMENT COMPLIANCE TESTING

(71) Applicant: Rapid7, Inc., Boston, MA (US)

(72) Inventors: James Witschey, Falls Church, VA (US); John Jason Senich, Silver Springs, MD (US); Jun Park, Arlington, VA (US); Val Komarov, Fairfax, VA (US); Miguel Ledezma, Alexandria, VA (US); Chris DeRamus, Ashburn, VA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,912

(22) Filed: Apr. 29, 2024

(65) Prior Publication Data
US 2024/0283812 A1    Aug. 22, 2024

Related U.S. Application Data

(63) Continuation of application No. 17/668,005, filed on Feb. 9, 2022, now Pat. No. 12,015,635.
(Continued)

(51) Int. Cl.
*H04L 29/06* (2006.01)
*G06F 9/445* (2018.01)
(Continued)

(52) U.S. Cl.
CPC ...... *H04L 63/1433* (2013.01); *G06F 9/44505* (2013.01); *G06F 9/5072* (2013.01)

(58) Field of Classification Search
CPC . H04L 63/1433; H04L 63/20; G06F 9/44505; G06F 9/5072; G06F 8/65; G06F 9/5077; G06Q 10/0635
See application file for complete search history.

(56) References Cited

U.S. PATENT DOCUMENTS 6,202,066 B1    3/2001    Barkley et al.
9,218,502 B1    12/2015    Doermann et al.
(Continued)

FOREIGN PATENT DOCUMENTS

CN        102307185 A        1/2012
KR     20030057263 A         7/2003

OTHER PUBLICATIONS

Montanari et al., "Evidence of log integrity in policy-based security monitoring", IEEE/IFIP International Conference on Dependable Systems and Networks Workshops (DSN 2012), Date of Conference: Jun. 25-28, 2012.*
(Continued)

*Primary Examiner* — Morshed Mehedi
(74) *Attorney, Agent, or Firm* — Wolf, Greenfield & Sacks, P.C.

(57) ABSTRACT

A unified cloud configuration evaluation (UCCE) system is described capable of evaluating both asset configurations in a live cloud environment and proposed configuration changes produced by a cloud configuration development (CCD) system. In embodiments, the UCCE system may be implemented as a Cloud Security Posture Management (CPSM) system that monitors assets in the cloud environment and check the assets' configurations for compliance with a set of compliance rules. In embodiments, the UCCE system ingests a cloud configuration definition generated by the CCD system. In embodiments, the CCD system is implemented as an Infrastructure as Code (IaC) system that allows a user to create a cloud configuration definition that describes proposed configuration changes to the cloud environment. The UCCE system is configured to interpret the cloud configuration definition and analyze the proposed configuration changes for compliance using the same set of compliance rules used for the live cloud environment.

20 Claims, 4 Drawing Sheets

Related U.S. Application Data

(60) Provisional application No. 63/181,269, filed on Apr. 29, 2021.

(51) Int. Cl.
  *G06F 9/50* (2006.01)
  *H04L 9/40* (2022.01)

(56) References Cited

U.S. PATENT DOCUMENTS

| | | | |
|---|---|---|---|
| 9,516,028 | B1 | 12/2016 | Andruschuk et al. |
| 10,129,344 | B2 | 11/2018 | Pogrebinsky et al. |
| 10,880,189 | B2 | 12/2020 | Martinez et al. |
| 12,015,635 | B2* | 6/2024 | Witschey ............ G06F 9/44505 |
| 2005/0262132 | A1 | 11/2005 | Morita et al. |
| 2008/0104393 | A1 | 5/2008 | Glasser et al. |
| 2011/0131275 | A1 | 6/2011 | Maida-Smith et al. |
| 2013/0219156 | A1* | 8/2013 | Sears ................ H04L 41/0866 713/1 |
| 2013/0290500 | A1* | 10/2013 | Narendra ............... H04L 67/51 709/223 |
| 2014/0280961 | A1 | 9/2014 | Martinez et al. |
| 2017/0054757 | A1 | 2/2017 | Siswick et al. |
| 2017/0141961 | A1* | 5/2017 | Cao ........................ H04L 43/50 |
| 2018/0091583 | A1 | 3/2018 | Collins et al. |
| 2018/0268347 | A1* | 9/2018 | Benedetti ........... G06Q 30/0631 |
| 2019/0121989 | A1 | 4/2019 | Mousseau et al. |
| 2019/0327271 | A1 | 10/2019 | Saxena et al. |
| 2020/0225655 | A1* | 7/2020 | Cella ................. G05B 23/0221 |
| 2022/0156631 | A1* | 5/2022 | Kanso ................... G06N 20/00 |
| 2022/0210201 | A1 | 6/2022 | Kastroulis |
| 2022/0263835 | A1 | 8/2022 | Pieczul et al. |
| 2022/0353289 | A1 | 11/2022 | Witschey et al. |
| 2023/0019705 | A1 | 1/2023 | Zettel, II et al. |
| 2023/0090828 | A1 | 3/2023 | Patro et al. |
| 2023/0148158 | A1 | 5/2023 | Bandarupalli et al. |

OTHER PUBLICATIONS

Bhattacharjee et al., "A Model-Driven Approach to Automate the Deployment and Management of Cloud Services", 2018 IEEE/ACM International Conference on Utility and Cloud Computing Companion (UCC Companion), Date of Conference: Dec. 17-20, 2018.*

Majumdar et al., Security compliance auditing of identity and access management in the cloud: Application to OpenStack. 2015 IEEE 7th International Conference on Cloud Computing Technology and Science (CloudCom). Nov. 30, 2015:58-65.

* cited by examiner

# US 12,395,517 B2

INFRASTRUCTURE AS CODE PREDEPLOYMENT COMPLIANCE TESTING

RELATED APPLICATIONS

This application is a continuation of and claims priority under 35 U.S.C. § 120 to U.S. patent application Ser. No. 17/668,005, filed Feb. 9, 2022, titled "INFRASTRUCTURE AS CODE PRE-DEPLOYMENT COMPLIANCE TESTING", which claims benefit of U.S. Provisional Patent Application No. 63/181,269, entitled "Infrastructure as Code Pre-Deployment Compliance Testing," filed Apr. 29, 2021, which is incorporated by reference herein in its entirety.

BACKGROUND

Many enterprises that operate computing assets in cloud-based infrastructure provider services such as AWS, AZURE, and GOOGLE CLOUD PLATFORM use Cloud Security Posture Management (or CPSM) systems to manage security and compliance risks of their cloud assets. CPSM systems are a class of security systems that provide a set of tools for compliance monitoring, DevOps integration, incident response, risk assessment, and risk visualization, among other functions. A CPSM system may implement capabilities to harvest and ingest data about assets deployed in the cloud and analyze such data using built-in or custom rules to determine whether the assets are compliant or non-compliant.

As the size of cloud environments continues to grow, Infrastructure as Code (IaC) systems are being increasingly used to control the cloud footprint in flexible, repeatable, and reviewable ways. An IaC system allows a user to specify the configuration of cloud resources and services in a declarative way in a cloud configuration definition. The cloud configuration definition may be used to generate a deployment plan, which can be run to automatically deploy the described asset to cloud-based infrastructure provider services.

An IaC system may be used to develop configuration changes to an existing cloud environment. A new cloud configuration definition may be checked for errors and/or compliance issues before the configuration changes are deployed to the live cloud environment. However, the compliance checks of the IaC system are performed without the full contextual information of the live cloud environment, so that the checks fail to provide a real-world evaluation of a new cloud configuration. Moreover, because compliance rules are specified differently in IaC systems and CPSM systems, it is not always clear whether compliance rules used by the two systems are equivalent. There is a general need in the field for improved compliance checking systems that can ensure continuous compliance of a set of configuration changes from pre-deployment to post-deployment.

SUMMARY OF EMBODIMENTS

A unified cloud configuration evaluation (UCCE) system is described capable of evaluating both asset configurations in a live cloud environment and proposed configuration changes produced by a cloud configuration development (CCD) system. In some embodiments, the UCCE system may be implemented as a Cloud Security Posture Management (CPSM) system that monitors assets in the cloud environment and check the assets' configurations for compliance with a set of compliance rules. In some embodiments, the UCCE system ingests a cloud configuration definition generated by the CCD system. In some embodiments, the CCD system is implemented as an Infrastructure as Code (IaC) system that allows a user to create a cloud configuration definition that describes proposed configuration changes to the cloud environment. The UCCE system is configured to interpret the cloud configuration definition, store the proposed configuration changes in a unified modeling layer used by the UCCE to model assets, and analyze the proposed configuration changes for compliance using the same set of compliance rules used for the live cloud environment.

Figure 1:
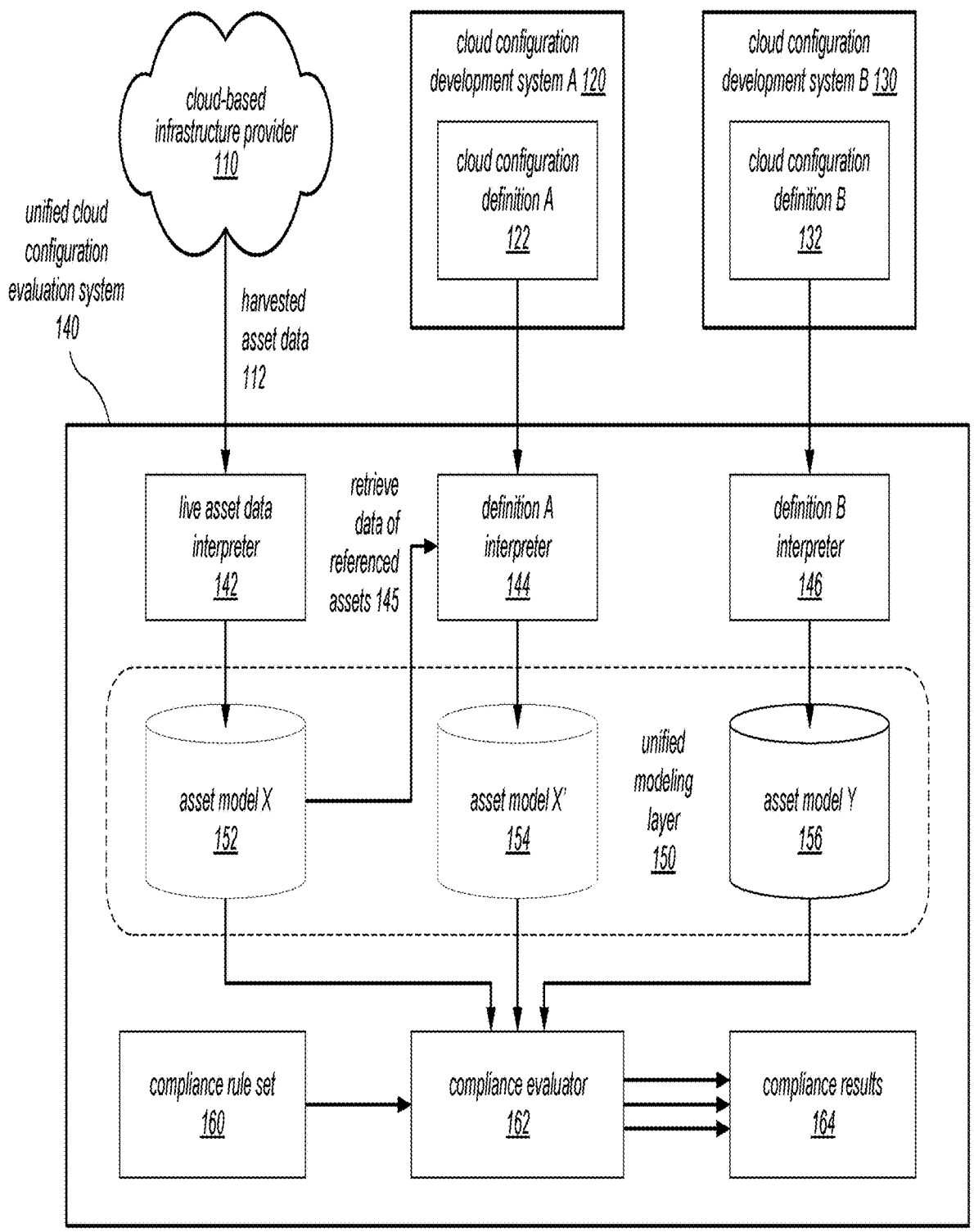
FIG. 1 is a block diagram illustrating a unified cloud configuration evaluation (UCCE) system that implements a unified modeling layer to model and evaluate live asset configurations in a cloud environment and configuration changes created in a cloud configuration development (CCD) system, according to some embodiments.

While embodiments are described herein by way of example for several embodiments and illustrative drawings, those skilled in the art will recognize that embodiments are not limited to the embodiments or drawings described. It should be understood that drawings and detailed description included herein are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Many enterprises that operate computing assets in cloud-based infrastructure provider services such as AWS, AZURE, and GOOGLE CLOUD PLATFORM use Cloud Security Posture Management (or CPSM) systems to manage security and compliance risks of their cloud assets. CPSM systems are a class of security systems that provide a set of tools for compliance monitoring, DevOps integration, incident response, risk assessment, and risk visualization, among other functions. A CPSM system may implement capabilities to harvest and ingest data about assets deployed in the cloud and analyze such data using built-in or custom rules to determine whether the assets are compliant or non-compliant. In some embodiments, the CPSM system may aggregate multiple compliance rules into custom rule sets that define compliance for specific use cases. Compliance rule sets may be used to drive other functionality of the CPSM system such as reporting and other compliance-related activities. In some embodiments, the CPSM system may check the compliance of the cloud assets on a regular basis to monitor the assets for policy violations over time. The latest state of the cloud environment and compliance status of the assets may be stored in a cache to provide a current view of the assets. Examples of CPSM systems include RAPID7 DIVVYCLOUD, PALO ALTO PRISMA, and others.

As the size of cloud environments continues to grow, Infrastructure as Code (IaC) systems are being increasingly used to control the cloud footprint in flexible, repeatable, and reviewable ways. An IaC system allows a user to specify the configuration of cloud resources and services in a declarative way in a cloud configuration definition. For example, a DevOps engineer may use an IaC system to create a cloud configuration definition for a proposed asset to be deployed to the cloud. The cloud configuration definition may be used to generate a deployment plan, which can be run to automatically deploy the described asset to cloud-based infrastructure provider services. Examples of IaC systems include TERRAFORM, ANSIBLE, and others.

An IaC system may be used to develop configuration changes to an existing cloud environment. A new cloud configuration definition may need to be checked for errors and/or compliance issues before the configuration changes are deployed to the live cloud environment. It is generally much better to catch compliance issues before configuration changes are actually implemented in order to avoid gaps in the cloud environment's continued compliance and the coordination cost of remediating any discovered problems. However, current IaC systems do not provide an easy way to ensure this continuity of compliance. In particular, current IaC systems do not allow users to evaluate a new cloud configuration using the compliance rules maintained by the CPSM system. As a result, the user must maintain two sets of compliance rules: one in the IaC system to check the cloud configuration definitions during the pre-deployment stage, and another in the CPSM system to check the cloud environment after the configuration changes are deployed. Every time the compliance rule set is changed, it must be changed twice in the two systems. For an enterprise with a large number of cloud assets and compliance policies, this constant synchronization between the two systems is extremely time-consuming, labor-intensive, and error-prone. Further, because the rules must be specified differently in the two systems, it is not always clear whether the rules used by the two systems are equivalent. Cases may arise where a proposed configuration change is found to be compliant under the IaC policy, but the results of the configuration change is found to violate the corresponding CPSM policy. Additionally, the IaC system does not generally have the same level of knowledge about the target cloud environment as the CPSM system, and thus cannot perform a full compliance evaluation of a configuration change in the same way as the CPSM system.

To address these and other problems in systems of the state of the art, this disclosure describes embodiments of a unified cloud configuration evaluation (UCCE) system that is capable of evaluating both asset configurations in a live cloud environment and proposed configuration changes produced by a cloud configuration development (CCD) system. In some embodiments, the UCCE system may be implemented as a CPSM system that is configured to monitor assets in the cloud environment and check the assets' configurations for compliance with a set of compliance rules. In addition, the UCCE system is also able to ingest a cloud configuration definition generated by the CCD system.

In some embodiments, the CCD system may be implemented as an IaC system that allows a user to create a cloud configuration definition that describes proposed configuration changes to the cloud environment. The UCCE system is configured to interpret the cloud configuration definition and analyze the proposed configuration changes for compliance using the same set of compliance rules used for the live cloud environment.

The UCCE system may maintain models for each cloud environment that it monitors. Data from both the live cloud environment and the CCD system are reduced to models stored in a common modeling form. Because the models are stored in the common form, they are treated the same way by the compliance checking routines of the UCCE system, and a single set of compliance rules can be applied to both types of input data. The UCCE system thus eliminates the need to maintain two sets of compliance rules for the two types of data.

In some embodiments, the UCCE system may implement a workflow to automate aspects of review and deployment of cloud asset configurations. Under one example workflow, a DevOps engineer may first create a proposed configuration change to a cloud environment in a CCD system and save the configuration change in a cloud configuration definition (e.g. a TERRAFORM template in TERRAFORM's HCL configuration language). The configuration change may propose to create new cloud assets or change existing assets in the cloud environment. The engineer may then submit the cloud configuration definition to a UCCE system (e.g. DIVVYCLOUD) to be checked for compliance violations based on compliance rules stored in the UCCE system. In some embodiments, the engineer may select one or more compliance rule sets from the UCCE system to apply to the cloud configuration definition. In response, the UCCE system will evaluate the cloud configuration definition against the selected compliance rule sets and report its findings (e.g. compliance evaluation results) to the engineer. Based on this feedback, the engineer may make further changes to cloud configuration definition until the definition does not produce any further compliance violations. The engineer may then approve the proposed changes and save the cloud configuration definition to a version control system for automatic deployment for further review. Advantageously, by using the same set of compliance rules to evaluate the proposed configuration changes to the cloud environment, the UCCE system will be able to catch most compliance issues before the cloud configuration definition is deployed to the cloud environment.

In some embodiments, cloud configuration definitions created in a CCD system may include cloud assets that are not fully known to the CCD system. For example, the DevOps engineer who may include a reference to an existing cloud asset in the cloud configuration definition but not the full configuration details of the asset. In some cases, a cloud configuration definition may include some assets that are identified by a name assigned by the CCD system and other assets that refer to existing cloud assets using a cloud provider-issued identifier. Because the CCD system does not possess full information for the referenced assets and other assets in the cloud environment, it can only provide a standalone and static analysis the proposed configuration change. For example, CCD system tools such as TERRAFORM SENTINEL cannot determine that a compute instance is noncompliant due to its connectivity to a misconfigured network that is only referenced in the cloud configuration definition. Additionally, CCD system tool cannot generally perform a dynamic analysis of the cloud configuration definition in the context of a changing cloud environment.

In contrast, the UCCE system has more detailed knowledge about the referenced assets and the cloud environment as a whole, and is able to conduct a more comprehensive analysis of the cloud configuration definition in these types of situations. In some embodiments, when the UCCE system receives a cloud configuration definition for evaluation, it will retrieve the configuration details of any referenced assets and combine this information with the definition to create the resulting model. In some embodiments, the details of the referenced assets may be retrieved from a cache of cloud environment that describes the most current configuration state of cloud environment. The UCCE system will perform compliance evaluation against the resulting model, so that the evaluation will take into account details of all referenced assets in the cloud configuration definition. Moreover, because the UCCE system is continuously collecting data about the live cloud environment to maintain an update-to-date view of the environment, it is capable of conducting a dynamic analysis of the proposed configuration changes based on the most current state of the environment. In some embodiments, the resulting model may be maintained by the UCCE system alongside the cloud configuration definition in the CCD system, and any subsequent changes to the referenced assets will be automatically reflected in the maintained model.

As will be appreciated by those skilled in the art, the disclosed UCCE system improves the functioning of conventional systems of the state of the art and provides numerous technical advantages not previously possible. These and other features and benefits of the UCCE system are discussed in further detail below, in connection with the figures.

FIG. 1 is a block diagram illustrating a unified cloud configuration evaluation system that can evaluate asset data harvested from a cloud environment and cloud configuration definitions created by a cloud configuration development system using a same set of compliance rules, according to some embodiments.

As shown, the figure depicts a unified cloud configuration evaluation (UCCE) system 140. Embodiments of the UCCE system 140 may be implemented as a CPSM system. For example, the UCCE system 140 may be configured to harvest asset data 112 from one or more cloud-based infrastructure provider services, such as AWS, AZURE, GOOGLE CLOUD PLATFORM. The harvested data 112 may include various configuration details of cloud assets hosted by the providers 110. In some embodiments, the UCCE system 140 may be configured to harvest the asset data over a public network such as the Internet.

In some embodiments, the UCCE system 140 implements a live asset data interpreter 142 to ingest the harvested asset data 112. The live asset data interpreter 142 may convert the harvested data from a provider-specific format to an asset model 152 stored in a provider-agnostic format. In some embodiments, the UCCE system may harvest data from multiple cloud-based infrastructure providers and unify the harvested data into models of a common format. In this manner, cloud assets from different providers can be analyzed the same way by the compliance evaluation routines of the UCCE system. In some embodiments, the UCCE system may harvest data from the infrastructure provider 110 on a regular basis to keep the asset model 152 up-to-date with the cloud environment hosted by the provider. The UCCE system may maintain a cache that contains the most recent state of the cloud environment.

As shown, the UCCE system 140 is also configured to ingest cloud configuration definitions created in cloud configuration development (CCD) systems, such as CCD systems A 120 and B 130. CCD systems 120 and 130 may generate cloud configuration definitions A 122 and B 132 in different formats. In some cases, a cloud configuration definition 122 may be generated as a text file. The cloud configuration definition may specify the proposed cloud asset configurations (or configuration changes) in a declarative way. In some cases, the cloud configuration definition may be provided as one or more template files. In some embodiments, the cloud configuration definition may be an artifact (e.g. a deployment plan) that is produced by the CCD system. In some embodiments, the cloud configuration definition may be provided in a binary form. In some embodiments, the cloud configuration definition may be stored in a CCD system database that can be accessed by the UCCE system.

In some embodiments, for each type of cloud configuration definition 122 and 132, the UCCE system will implement a definition interpreter (e.g. definition A interpreter 144 and definition B interpreter 146). The definition interpreters will parse the cloud configuration definitions and convert them from a CCD system-specific format to an asset model in the UCCE system (e.g. asset models 154 and 156) in the UCCE system. In some embodiments, all asset models 152, 154, and 156 in the UCCE system are maintained as part of a unified modeling layer 150. The unified modeling layer 150 may store all asset models 152, 154, and 156 in a common modeling structure or language. In some embodiments, the asset models may be stored in an internal database. The different interpreters 142, 144, and 146 are configured to write model data into the model database. The unified modeling layer may provide an access interface (e.g. an API) that allows other components of the UCCE system to access the model data in the database.

As shown, definition interpreter 144 in this example uses data from another asset model X 152 to generate asset model X' 154. This situation may occur where the input cloud configuration definition 122 contains references to assets in the target cloud environment. For example, cloud configuration definition A 122 may specify a configuration change of the cloud environment hosted by infrastructure provider 110, and references certain live assets in that environment. In some embodiments, when the input cloud configuration definition refers live assets known to the UCCE system, the definition interpreter 144 will automatically retrieve 145 data about the referenced assets from an existing asset model X 152 and combine the retrieved information with the cloud configuration definition to generate the asset model X' 154. In some embodiments, model X' 154 may be automatically updated whenever cloud configuration definition A 122 or any of the referenced assets changes.

As shown, the UCCE system implements a compliance evaluator component 162 to perform compliance evaluations on the asset models. To evaluate an asset model, the compliance evaluator 162 may apply one or more compliance rule sets 160 to an asset model to produce a compliance result 164. The compliance rules are applied to all models in the unified modeling layer in the same way, no matter where that model data was sourced from. The compliance rule set 160 may include both built-in rules provided by the UCCE system and custom rules defined by the customers of the UCCE system. The compliance results 164 may be provided as a report that indicates a compliance status of the modeled assets. In some embodiments, compliance checks may be performed regularly (e.g. daily) to check the models in the unified modeling layer 150. In some embodiments, the UCCE system 140 may provide an integration interface to the CCD system 120, so that the compliance results 164 are provided to the CCD system 120, which may be displayed on a graphical user interface of the CCD system.

Figure 2:
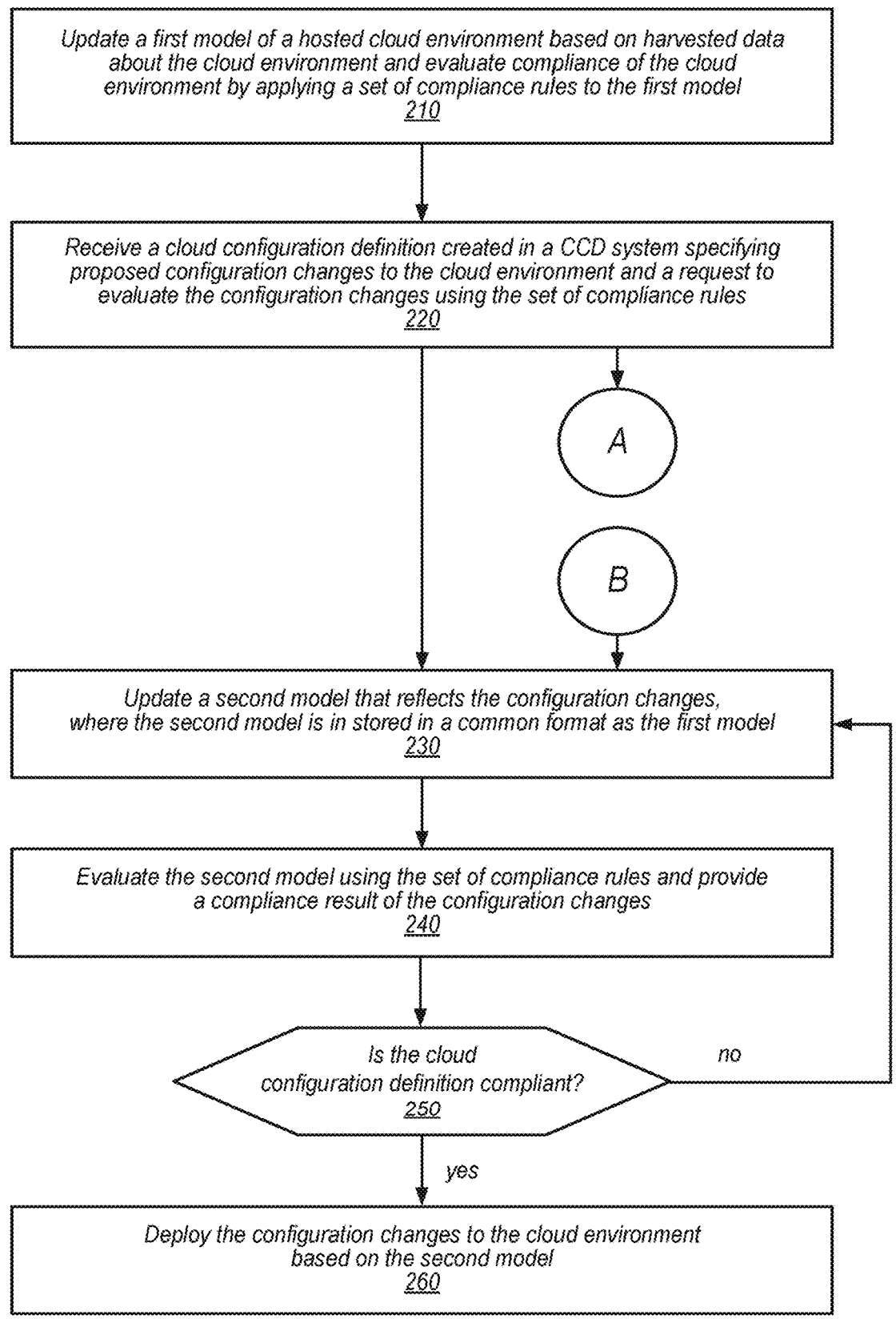
FIG. 2 is a flow chart illustrating a process performed by a UCCE system to evaluate compliance of proposed configuration to a cloud environment created in a CCD system, according to some embodiments.

FIG. 2 is a flowchart illustrating a process performed by a UCCE system to evaluate a cloud configuration definition created in a CCD system, according to some embodiments. The illustrated process may be performed by an embodiment of the UCCE system 140 of FIG. 1.

The process begins at operation 210. At operation 210, the UCCE system updates a first model of a hosted cloud environment based on harvested data about the cloud environment. In some embodiments, the UCCE system may be implemented as a CPSM system that regularly collects such data from infrastructure providers (e.g. provider 110). In some embodiments, the collected data is used to maintain models of cloud environments hosted by the providers. These models (e.g. model 152) may be stored in a provider-agnostic format, so that harvested data from different infrastructure providers can be processed the same way in the UCCE system. For example, the models may be used by the UCCE system to perform ongoing compliance evaluations of many cloud environments. In some embodiments, the UCCE system may allow users to specify one or more sets of compliance rules (e.g. compliance rule set 160) to be regularly applied to the model. The compliance rules may define custom compliance policies, for example, to check for security vulnerabilities in the cloud environment.

At operation 220, a cloud configuration definition is received. The cloud configuration definition (e.g. definition 122) is created in a CCD system (e.g. CCD system 120) and specifies proposed configuration changes to the cloud environment. A request is also received to evaluate the proposed changes using the set of compliance rules associated with the cloud environment. In some embodiments, the request may come from the CCD system. For example, the CCD system may implement one or more GUIs that allow a user to select a compliance rule set from the UCCE system to evaluate the proposed configuration changes that the user is working on. In some embodiments, the request may be received directly from a user of the UCCE system. For example, the UCCE system may provide one or more GUIs that allow users to evaluate cloud configuration definitions produced by the CCD system.

At operation 230, a second model is updated to reflect the configuration changes in the cloud configuration definition. The second model (e.g. model 154) is stored in the same format as the first model built from live asset data harvested from the infrastructure provider. In some embodiments, the second model may be generated by a definition interpreter (e.g. definition interpreter 144) that is configured to transform cloud configuration definitions from the CCD system to models in the UCCE system. In some embodiments, the second model may be stored in a unified modeling layer of the UCCE system (e.g. unified modeling layer 150) that is responsible for maintaining all models in the UCCE system. The unified modeling layer is configured to store all models in a common modeling format regardless of the source of the modeled data.

At operation 240, the second model is evaluated using the set of compliance rules, and a compliance result of the configuration changes is provided. As discussed, because the second model is stored in the same format as the first model, the same compliance routines (e.g. compliance evaluator 162) may be used for the first and second models. The proposed configuration changes to the cloud environment will be evaluated in the same way as the actual configurations of the live cloud environment. In some embodiments, the results of the evaluation (e.g. compliance results 164) may be sent as feedback to the CCD system, which may be displayed on a user interface of the CCD system.

At operation 250, a determination is made whether the cloud configuration definition is compliant. In some embodiments, this determination may be made at the CCD system, by the DevOps engineer who is making changes to the cloud configuration definition. Once the proposed configuration changes are fully compliant, the engineer may approve the changes for deployment. In some embodiments, this determination may be made at the UCCE system. For example, the UCCE system may be configured to automatically deploy the configuration changes to the cloud environment, but only if the changes pass specified compliance checks. If the cloud configuration definition is not compliant, the process will loop back to operation 230, where the UCCE system will continue to update the second model (either periodically or in response to changes to the definition) and evaluate the model against the compliance rules.

If the cloud configuration definition is found to be compliant, the process proceeds to operation 260, where the specified configuration changes are deployed to the cloud environment. In some embodiments, the UCCE system may perform the deployment based on the second model generated from the cloud configuration definition. The UCCE system may implement a deployment component that translates the configuration settings indicated in the model into configuration instructions for the particular infrastructure provider. Advantageously, because the same set of compliance rules are used to evaluate the compliance of the configuration changes both before and after deployment, the disclosed UCCE system is able to identify most new compliance issues before the changes are deployed to the cloud environment.

Figure 3:
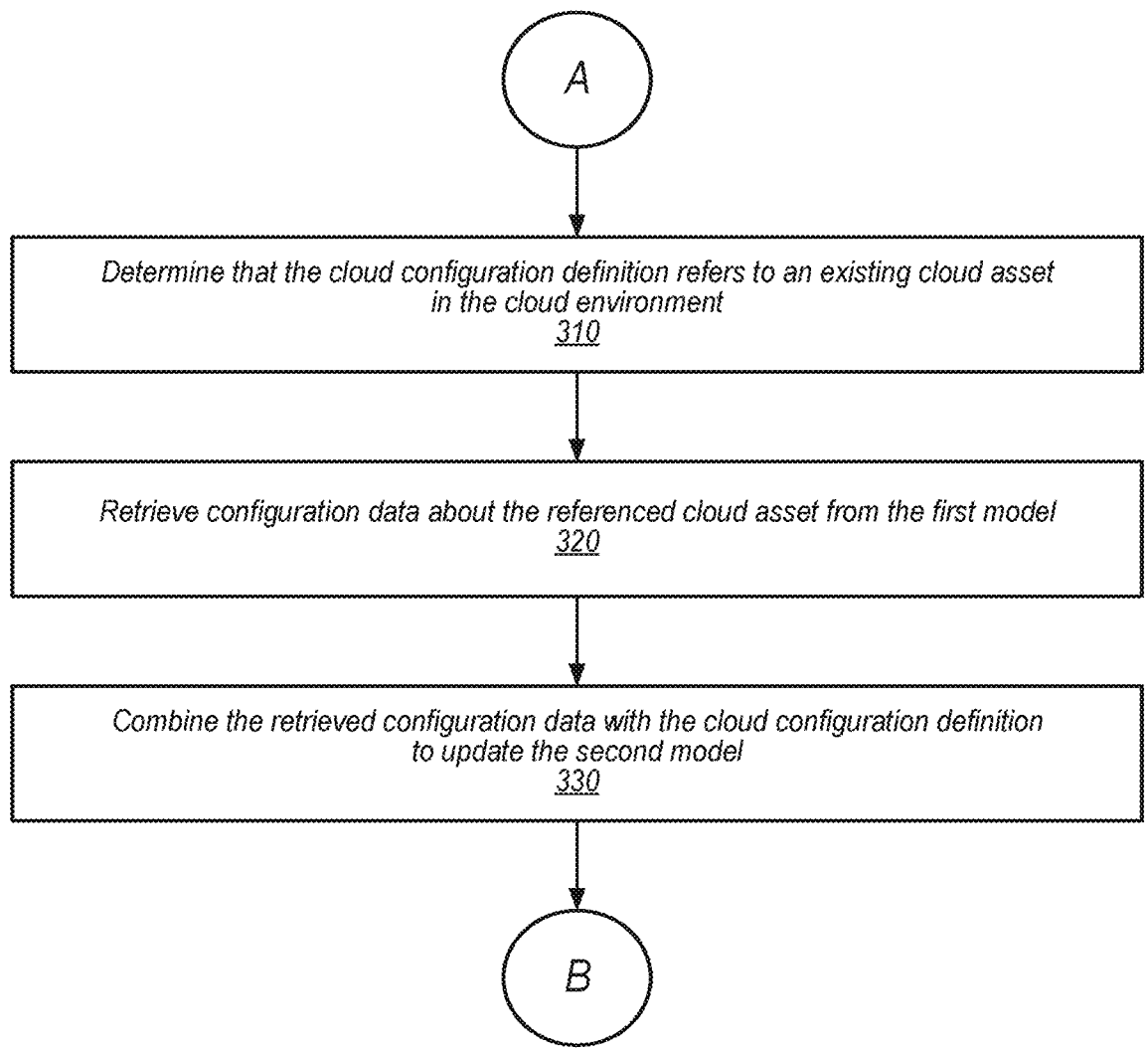
FIG. 3 is a flow chart illustrating a process performed by the UCCE system to combine the proposed configuration changes with harvested configuration data of an existing cloud asset in the cloud environment, according to some embodiments.

FIG. 3 is a flowchart illustrating a process performed by a UCCE system to evaluate a cloud configuration definition created in a CCD system that references an existing cloud asset, according to some embodiments. As shown, the depicted process may be performed as part of the process of FIG. 2. The process may be performed by an embodiment of the UCCE system 140 of FIG. 1 (e.g., using definition interpreter 144 of FIG. 1).

At operation 310, the definition interpreter determines that the received cloud configuration definition refers to an existing cloud asset in the cloud environment. As discussed, certain types of CCD systems allow users to include references to existing cloud assets without providing the full details of such assets. These assets may be indicated in the configuration definition by an infrastructure provider-issued identifier that uniquely identifies the asset of the infrastructure provider network. In some embodiments, the definition interpreter is configured to recognize these referenced assets in the cloud configuration definition, for example, based on their identifiers or a designation that they are referenced assets.

At operation 320, the definition interpreter retrieves configuration data about the referenced cloud asset from the first model associated with the cloud environment. As discussed, the UCCE system may maintain the first model based on harvested data from the cloud environment, which may provide a cache that indicates the current configuration state of the cloud environment. The definition interpreter may be configured to search the cache for the referenced asset using its provider-issued identifier. If the asset is found in the first model, the asset's configuration details are retrieved by the definition interpreter.

At operation 330, the retrieved configuration data of the referenced asset is combined with the cloud configuration definition to update the second model. In particular, the retrieved configuration data is used to fill in the missing details of the referenced asset in the cloud configuration definition. In this way, the second model may be augmented with configuration details of all referenced assets in the cloud configuration definition, so that the compliance evaluator of the UCCE system can use such information to conduct a more thorough compliance evaluation. In some embodiments, the UCCE system may be configured to automatically update the second model whenever any referenced assets are changed in the cloud environment.

Figure 4:
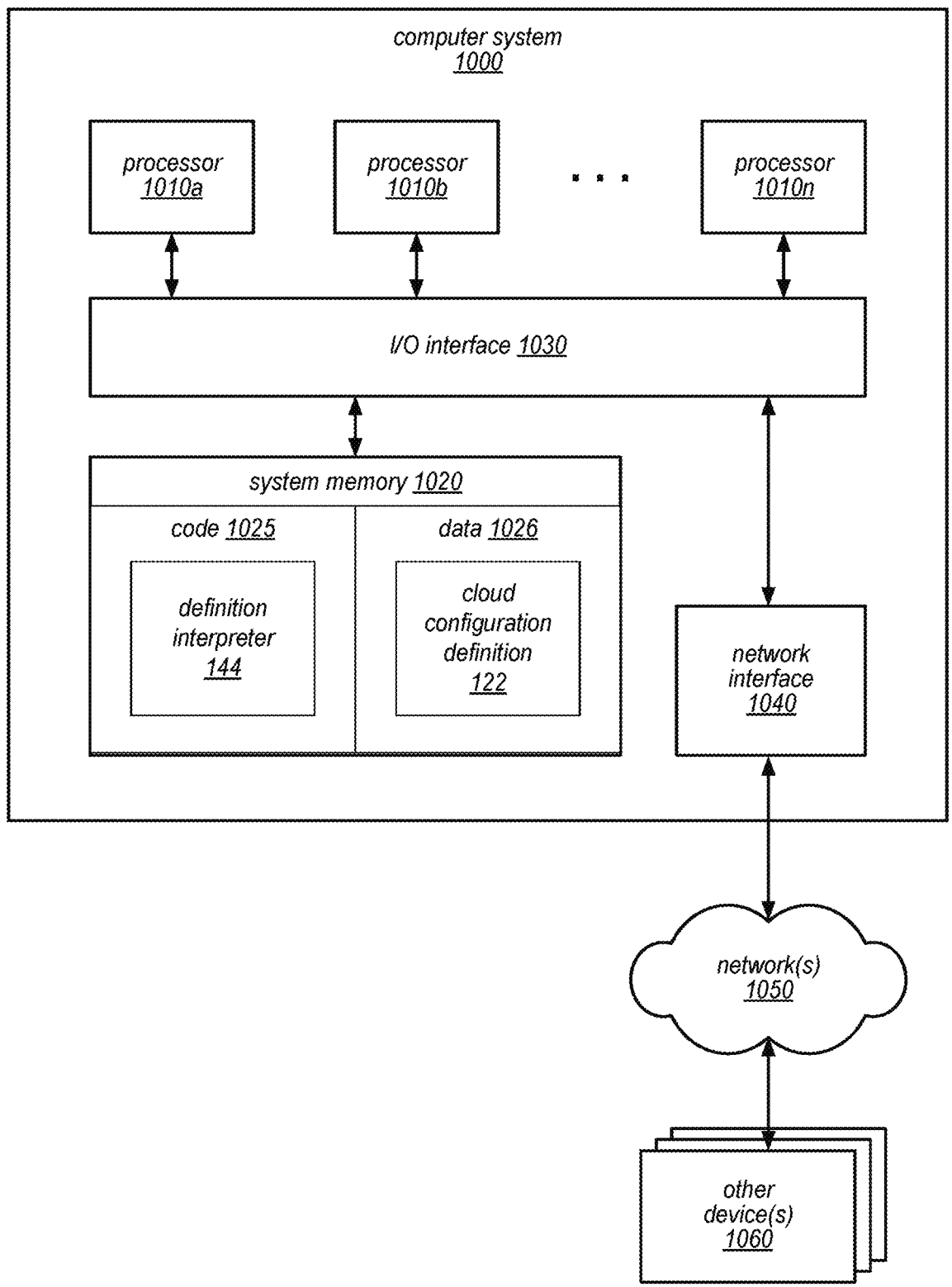
FIG. 4 is a block diagram illustrating a computer system that can be used to implement one or more portions of a UCCE system that implements a unified modeling layer, according to some embodiments.

FIG. 4 is a block diagram illustrating an example computer system that can be used to implement one or more portions of a UCCE system to evaluate a cloud configuration definition created in a CCD system, according to some embodiments. The computer system 1000 may be used to implement one or more components of the UCCE 140 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010. These processors 1010 may multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement definition interpreter 144, as discussed. The system memory 1020 may also be used to store data 1026 needed or produced by the executable instructions. For example, the in-memory data 1026 may be used to store the cloud configuration definition 122 produced by a CCD system, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
   at least one computer device configured to implement a unified cloud configuration evaluation (UCCE) system; and
   at least one non-transitory computer-readable storage medium storing executable instructions that, when executed, cause the at least one computer device to perform:
      obtaining, in a first format, live asset configuration data about assets in a cloud environment;
      converting the live asset configuration data from the first format to a second format associated with the UCCE system;
      obtaining, in a third format, a cloud configuration definition specifying proposed configuration changes to the cloud environment;
      converting the cloud configuration definition from the third format to the second format associated with the UCCE system; and
      evaluating compliance of the live asset configuration data and the proposed configuration changes using a set of compliance rules by:
         evaluating compliance of the live asset configuration data by applying the set of compliance rules to a first model of the cloud environment generated using the live asset configuration data in the second format associated with the UCCE system, and
         evaluating compliance of the proposed configuration changes by applying the set of compliance rules to a second model of the cloud environment generated using the cloud configuration definition in the second format associated with the UCCE system.

2. The system of claim 1, wherein the executable instructions, when executed, further cause the at least one computer device to perform:
   generating the first model of the cloud environment using the live asset configuration data in the second format associated with the UCCE system.

3. The system of claim 1, wherein the executable instructions, when executed, further cause the at least one computer device to perform:
   generating the second model reflecting the proposed configuration changes using the cloud configuration definition in the second format associated with the UCCE system.

4. The system of claim 1, wherein obtaining the live asset configuration data about assets in the cloud environment comprises obtaining the live asset configuration data from a cloud computing infrastructure provider service.

5. The system of claim 1, wherein obtaining the cloud configuration definition comprises obtaining the cloud configuration definition from a cloud configuration development (CCD) system.

6. The system of claim 1, wherein the executable instructions, when executed, further cause the at least one computer device to perform:
   determining that the proposed configuration changes comply with the set of compliance rules, and in response to the determining, initiating deployment of the proposed configuration changes to the cloud environment.

7. The system of claim 1,
   wherein the cloud environment is hosted by a cloud computing infrastructure provider service,
   wherein the cloud configuration definition is obtained from a cloud configuration development (CCD) system,
   wherein the first format is a provider-specific format specific to the cloud computing infrastructure provider service, and
   wherein the third format is a definition language specific to the CCD system.

8. The system of claim 1, wherein the executable instructions, when executed, further cause the at least one computer device to perform:
   checking for security vulnerabilities in the cloud environment using the first model.

9. A method, comprising:
   using at least one computer device to perform:
      obtaining, in a first format, live asset configuration data about assets in a cloud environment;
      converting the live asset configuration data from the first format to a second format associated with a unified cloud configuration evaluation (UCCE) system;
      obtaining, in a third format, a cloud configuration definition specifying proposed configuration changes to the cloud environment;
      converting the cloud configuration definition from the third format to the second format associated with the UCCE system; and
      evaluating compliance of the live asset configuration data and the proposed configuration changes using a set of compliance rules by:
         evaluating compliance of the live asset configuration data by applying the set of compliance rules to a first model of the cloud environment generated using the live asset configuration data in the second format associated with the UCCE system, and
         evaluating compliance of the proposed configuration changes by applying the set of compliance rules to a second model of the cloud environment generated using the cloud configuration definition in the second format associated with the UCCE system.

10. The method of claim 9, further comprising:
    generating the first model of the cloud environment using the live asset configuration data in the second format associated with the UCCE system.

11. The method of claim 9, further comprising:
    generating the second model reflecting the proposed configuration changes using the cloud configuration definition in the second format associated with the UCCE system.

12. The method of claim 9,
    wherein obtaining the live asset configuration data about assets in the cloud environment comprises obtaining the live asset configuration data from a cloud computing infrastructure provider service, and wherein obtaining the cloud configuration definition comprises obtaining the cloud configuration definition from a cloud configuration development (CCD) system.

13. The method of claim 9, further comprising:
determining that the proposed configuration changes comply with the set of compliance rules, and in response to the determining, initiating deployment of the proposed configuration changes to the cloud environment.

14. The method of claim 9,
wherein the cloud environment is hosted by a cloud computing infrastructure provider service,
wherein the cloud configuration definition is obtained from a cloud configuration development (CCD) system,
wherein the first format is a provider-specific format specific to the cloud computing infrastructure provider service, and
wherein the third format is a definition language specific to the CCD system.

15. The method of claim 9, further comprising:
checking for security vulnerabilities in the cloud environment using the first model.

16. At least one non-transitory computer-readable storage medium storing executable instructions that, when executed, cause at least one computer device to perform a method comprising:
obtaining, in a first format, live asset configuration data about assets in a cloud environment;
converting the live asset configuration data from the first format to a second format associated with a unified cloud configuration evaluation (UCCE) system;
obtaining, in a third format, a cloud configuration definition specifying proposed configuration changes to the cloud environment;
converting the cloud configuration definition from the third format to the second format associated with the UCCE system; and
evaluating compliance of the live asset configuration data and the proposed configuration changes using a set of compliance rules by:
evaluating compliance of the live asset configuration data by applying the set of compliance rules to a first model of the cloud environment generated using the live asset configuration data in the second format associated with the UCCE system, and
evaluating compliance of the proposed configuration changes by applying the set of compliance rules to a second model of the cloud environment generated using the cloud configuration definition in the second format associated with the UCCE system.

17. The at least one non-transitory computer-readable storage medium of claim 16, wherein the method further comprises:
generating the first model of the cloud environment using the live asset configuration data in the second format associated with the UCCE system, and
generating the second model reflecting the proposed configuration changes using the cloud configuration definition in the second format associated with the UCCE system.

18. The at least one non-transitory computer-readable storage medium of claim 16,
wherein obtaining the live asset configuration data about assets in the cloud environment comprises obtaining the live asset configuration data from a cloud computing infrastructure provider service, and
wherein obtaining the cloud configuration definition comprises obtaining the cloud configuration definition from a cloud configuration development (CCD) system.

19. The at least one non-transitory computer-readable storage medium of claim 16, wherein the method further comprises:
determining that the proposed configuration changes comply with the set of compliance rules, and in response to the determining, initiating deployment of the proposed configuration changes to the cloud environment.

20. The at least one non-transitory computer-readable storage medium of claim 16, wherein the method further comprises:
checking for security vulnerabilities in the cloud environment using the first model.

* * * * *